United States Patent [19]

Röckrath et al.

[11] Patent Number: 5,534,306

[45] Date of Patent: Jul. 9, 1996

[54] PROCESS FOR THE PREPARATION OF A MULTICOAT FINISH, NON-AQUEOUS COATINGS AND AUTOCROSSLINKABLE POLYACRYLATE RESINS

[75] Inventors: Ulrike Röckrath, Marl; Peter Betz, Münster; Ulrich Poth, Münster; Georg Wigger, Münster, all of Germany

[73] Assignee: BASF Lacke + Farben, AG, Muenster-Hiltrup, Germany

[21] Appl. No.: 256,553

[22] PCT Filed: Jan. 15, 1993

[86] PCT No.: PCT/EP93/00088

§ 371 Date: Jul. 15, 1994

§ 102(e) Date: Jul. 15, 1994

[87] PCT Pub. No.: WO93/14882

PCT Pub. Date: Aug. 5, 1993

[30] Foreign Application Priority Data

Jan. 23, 1992 [DE] Germany .......................... 42 01 724.6

[51] Int. Cl.$^6$ .............................. B05D 1/36; B05D 7/00; C08F 24/00; C08F 122/04

[52] U.S. Cl. ................... 427/407.1; 427/410; 427/412.1; 427/387; 526/271; 526/273

[58] Field of Search .................................... 427/410, 387, 427/407.1, 712.1; 523/434; 526/279, 328, 5, 329.6, 271, 273

[56] References Cited

U.S. PATENT DOCUMENTS

| | | | |
|---|---|---|---|
| 3,136,736 | 6/1964 | Washburne et al. | 525/119 |
| 3,953,644 | 4/1976 | Camelon et al. | 428/220 |
| 4,262,072 | 4/1981 | Wendling et al. | 427/162 |
| 4,291,135 | 9/1981 | Höhlein et al. | 427/387 |
| 4,415,697 | 11/1983 | Peng et al. | 525/512 |
| 4,446,283 | 5/1984 | Doi et al. | 525/344 |
| 4,499,150 | 2/1985 | Dowblenko et al. | 427/409 |
| 4,564,557 | 1/1986 | Ohgushi et al. | 427/388.2 |
| 4,732,791 | 3/1988 | Blackburn et al. | 427/409 |
| 4,906,677 | 3/1990 | Barsotti et al. | 523/400 |
| 5,369,178 | 11/1994 | Miyazaki et al. | 427/407.1 |
| 5,376,706 | 12/1994 | Barsotti et al. | 523/434 |

FOREIGN PATENT DOCUMENTS

| | | |
|---|---|---|
| 0159894 | 4/1985 | European Pat. Off. . |
| 3838748A1 | 11/1988 | Germany . |
| 4008343A1 | 3/1990 | Germany . |
| 4131089A1 | 9/1991 | Germany . |
| 2234691 | 2/1991 | United Kingdom . |

*Primary Examiner*—Diana Dudash
*Attorney, Agent, or Firm*—Anne Gerry Sabourin

[57] ABSTRACT

The invention relates to a process for the preparation of multicoat finishes of the basecoat/clearcoat type in which transparent topcoats are employed which contain (A) as binder, an autocrosslinkable polyacrylate resin which contains on statistical average at least one epoxide group, at least one acid anhydride group and at least 0.2 tri-, di- or monoalkoxysilane group per molecule, or a mixture of such autocrosslinkable polyacrylate resins, and (B) at least one acid and/or at least one base as crosslinking catalyst.

9 Claims, No Drawings

PROCESS FOR THE PREPARATION OF A MULTICOAT FINISH, NON-AQUEOUS COATINGS AND AUTOCROSSLINKABLE POLYACRYLATE RESINS

The invention relates to a process for the preparation of a multicoat finish, in which (1) a pigmented basecoat is applied to the substrate surface, (2) a polymer film is formed from the basecoat applied in step (1), (3) a nonaqueous transparent topcoat is applied to the resulting basecoat layer, and subsequently (4) the basecoat layer and topcoat layer are baked together.

The invention also relates to nonaqueous coatings and autocrosslinkable polyacrylate resins.

The basecoat/clearcoat process described above is known and is employed in particular for the production of finishes, especially metallic finishes on car bodies (cf. eg. U.S. Pat. No. 3,639,147 and EP-A-38 127).

Nonaqueous transparent topcoats comprising a hydroxyl-containing resin and a polyisocyanate or an amino resin as crosslinking agent are usually employed in step (3) of the above-described process. Polyisocyanate-containing transparent topcoats must either be employed in the form of two-component coatings or using blocked polyisocyanates. The use of two-component coatings is laborious, and transparent finishes produced using blocked polyisocyanates have a tendency to yellow. Topcoats containing amino resins have an insufficient acid resistance and give off formaldehyde during baking.

The object of the present invention is to provide non-aqueous transparent topcoats which do not have the above-described disadvantages of the prior art. In addition, the new topcoats should give finishes having satisfactory properties even when they are applied with a high content of constituents which are nonvolatile under application conditions (i.e. with a low content of organic solvents).

Surprisingly this object is achieved in that, in step (3) of the above described process, a non-aqueous transparent topcoat is employed which comprises (A) as binder, an autocrosslinkable polyacrylate resin which contains on statistical average at least one epoxide group, at least one acid anhydride group and at least 0.2 tri-, di- or monoalkoxysilane groups per molecule, or a mixture of such autocrosslinkable polyacrylate resins, and (B) at least one acid and/or at least one base as crosslinking catalyst.

DE-A-40 08 343 describes transparent topcoats comprising polyacrylate resins which contain on statistical average at least one epoxide group and at least one silanol group and/or at least one hydrolyzable group bonded directly to a silicon atom per molecule. The coatings described in DE-A-40 08 343 contain in addition to the polyacrylate resins at least one other crosslinking agent. Crosslinking agents which can be employed are polyisocyanate compounds, amino resins and carboxylic acid compounds such as, for example, a resin or a compound having on average at least two carboxyl groups in the molecule, or a resin or a compound having on average at least one carboxylic acid anhydride group in the molecule. The topcoats described in DE-A-40 08 343 have the disadvantage that in many cases there are instances of incompatibility between the polyacrylate resins and the crosslinking agents, which leads to deterioration in the storage stability and the optical properties of the paint films.

The topcoats according to the invention are notable for a high degree of stability on storage. They give topcoat finishes which exhibit good scratch resistance, good resistance to acids and organic solvents, and high gloss, good DOI values and good leveling. In addition, these good properties are retained when the coatings are applied with a low content of organic solvents (less than 50% by weight). The transparent topcoats according to the invention preferably have a solids content of not less than 50% by weight (1 h, 130° C.).

The autocrosslinkable polyacrylate resin (A) present as binder in the coatings employed according to the invention contains on statistical average at least one epoxide group, preferably 1.0 to 5.0, particularly preferably 1.0 to 3.0, and very particularly preferably 1.0 to 1.8 epoxide groups, at least one acid anhydride group, preferably 1.0 to 5.0, particularly preferably 1.0 to 3.0, and very particularly preferably 1.0 to 1.8, acid anhydride groups and at least 0.2 tri-, di- or monoalkoxysilane groups, preferably 0.2 to 2.0, particularly preferably 0.3 to 1.6, and very particularly preferably 0.4 to 1.0 tri-, di- or monoalkoxysilane groups per molecule. A mixture of such polyacrylate resins can also be employed as binder in the coatings employed according to the invention.

It is preferred for the polyacrylate resin (A) to contain, in addition to epoxide groups, acid anhydride groups and tri-, di- or monoalkoxysilane groups, no further functional groups, in particular hydroxyl groups, or, for example due to impurities, only small amounts of such groups.

The autocrosslinkable polyacrylate resin (A) has a number-average molecular weight of from 1000 to 50,000, preferably 1000 to 5000 and particularly preferably 1000 to 3000 (determined by gel permeation chromatography using a polystyrene standard).

The autocrosslinkable polyacrylate resin (A) can be prepared by polymerizing a mixture of (a) an ester of acrylic acid or methacrylic acid or a mixture of esters of acrylic acid and/or methacrylic acid, (b) an olefinically unsaturated epoxide compound or a mixture of olefinically unsaturated epoxide compounds, (c) an olefinically unsaturated acid anhydride or a mixture of olefinically unsaturated acid anhydrides, and (d) an olefinically unsaturated compound which contains at least one tri-, di- or monoalkoxysilane group per molecule, and optionally (e) a further olefinically unsaturated compound different from (a), (b), (c) and (d) or a mixture of such unsaturated compounds.

Components (b), (c) and (d) must be present in the mixture in an amount such that the autocrosslinkable polyacrylate resin (A) obtained after polymerizing the mixture has on statistical average at least one epoxide group, preferably 1.0 to 5.0, particularly preferably 1.0 to 3.0, and very particularly preferably 1.0 to 1.8, epoxide groups, at least one acid anhydride group, preferably 1.0 to 5.0, particularly preferably 1.0 to 3.0, and very particularly preferably 1.0 to 1.8, acid anhydride groups, and at least 0.2 tri-, di- or monoalkoxysilane groups, preferably 0.2 to 2.0, particularly preferably 0.3 to 1.6, and very particularly preferably 0.4 to 1.0, tri-, di- or monoalkoxysilane groups per molecule. The autocrosslinkable polyacrylate resins according to the invention are generally obtained by polymerizing mixtures containing 0.5 to 65, preferably 10 to 65 and particularly preferably 35 to 65% by weight of component (a), 14 to 70, preferably 14 to 40 and particularly preferably 14 to 25% by weight of component (b), 10 to 50, preferably 10 to 30 and particularly preferably 10 to 17.5% by weight of component (c), 10 to 50, preferably 10 to 40 and particularly preferably 10 to 25% by weight of component (d) and 0 to 50, preferably 0 to 20 and particularly preferably 5 to 10% by weight of component (e), the sum of the weight percentages for components (a) to (e) being 100% by weight. It should also be taken into account here that the proportions of the individual components in the mixture to be subjected to copolymerization are such that the abovementioned amounts of epoxide, acid anhydride and tri-, di- or monoalkoxysilane groups are present in the resulting polyacrylate resins. The content of these groups in the polyacrylate resins corresponds to the content of the same groups in the mixture of components (a) to (e), since it can be assumed that the chemical composition of the polyacrylate resins corresponds to the chemical composition of the mixture of components (a) to (e).

The polymerization can be carried out by conventional processes of free-radical polymerization, such as bulk or solution polymerization. In such processes the monomers are copolymerized at elevated temperatures, preferably at 60° to 160° C. particularly preferably at 80° to 145° C. in the presence of free-radical initiators and, if appropriate, molecular weight regulators. The polymerization is preferably carried out in inert solvents. Examples of suitable solvents are aromatics such as benzene and toluene, esters such as ethyl acetate, butyl acetate, hexyl acetate, heptyl acetate, methylglycol acetate, ethylglycol acetate and methoxypropyl acetate, ethers such as tetrahydrofuran, dioxane and diethylene glycol dimethyl ether, and ketones such as acetone, methyl ethyl ketone, methyl isobutyl ketone, methyl n-amyl ketone and methyl isoamyl ketone. It is of course also possible to employ mixtures of these solvents.

The polymerization is in general carried out under atmospheric pressure, but can also be carried out at increased pressures of up to 20 bar. The initiators are generally employed in amounts of from 0.05 to 15% by weight, preferably 0.1 to 10% by weight, based on the total amount of the monomers. Suitable initiators are conventional free-radical initiators, for example aliphatic azo compounds such as azobisisobutyronitrile, azobis-2-methylvaleronitrile, 1,1'-azobis-1-cyclohexanenitrile and alkyl esters of 2,2'-azobisisobutyric acid; symmetrical diacyl peroxides, for example acetyl, propionyl or butyryl peroxide, benzoyl peroxides substituted by bromine, nitro, methyl or methoxy groups, and lauryl peroxides; symmetrical peroxydicarbonates, for example diethyl, diisopropyl, dicyclohexyl and benzoyl peroxydicarbonate, tert-butyl peroxy-2-ethylhexanoate, tert-butyl perbenzoate or tert-butylphenyl peracetate, and peroxycarbonates such as, for example, tert-butyl N-(phenylperoxy)carbonate [sic] or tert-butyl N-(2-, 3- or 4-chlorophenylperoxy)carbonate [sic]; hydroperoxides such as, for example, tert-butyl hydroperoxide, cumene hydroperoxide; dialkyl peroxides such as dicumyl peroxide; tert-butyl cumyl peroxide or di-tert-butyl peroxide.

To control the molecular weight of the copolymers, conventional regulators can be employed in the course of the preparation. Examples which can be mentioned are tert-dodecyl mercaptan, n-dodecyl mercaptan or diisopropylxanthogenic disulfide. The regulators can be added in amounts of up to 10% by weight, preferably 0.5 to 5% by weight, based on the total amount of the monomers. The solutions of autocrosslinkable polyacrylate resins obtained in the copolymerization reaction can then be supplied without further workup for use according to the invention. However, it is of course also possible to free the polyacrylate resins from residual amounts of unreacted monomers and solvent which may still be present by distillation, and to supply the polyacrylate resins, present as the distillation residue, for use according to the invention.

In principle, component (a) can be any copolymerizable esters of acrylic acid or methacrylic acid or mixtures of esters of acrylic acid and/or methacrylic acid. Examples which may be mentioned are: alkyl acrylates and alkyl methacrylates having 1 to 12 C atoms in the alkyl moiety, for example methyl, ethyl, propyl, n-butyl, isobutyl, tert-butyl, pentyl, hexyl, heptyl, 2-ethylhexyl and lauryl acrylate and methacrylate; cycloalkyl acrylates and cycloalkyl methacrylates, for example cyclohexyl acrylate and cyclohexyl methacrylate, and hydroxy-functional esters of acrylic acid or methacrylic acid, for example hydroxyethyl, hydroxypropyl and hydroxybutyl acrylate and methacrylate. It is preferred to employ as component (a) only those monomers which contain no functional groups, for example hydroxyl groups.

In principle, component (b) may be any copolymerizable olefinically unsaturated epoxide compounds containing at least one epoxide group in the molecule or mixtures of such epoxide compounds. Examples are: glycidyl acrylate and glycidyl methacrylate. Further examples of epoxide compounds which can be employed can be found in DE-A-40 08 343 on pages 26 to 35. Glycidyl acrylate and glycidyl methacrylate are preferably employed.

In principle, component (c) may be any copolymerizable olefinically unsaturated acid anhydrides or mixtures of copolymerizable olefinically unsaturated acid anhydrides, the term acid anhydride being understood here to refer to compounds containing at least one intramolecular carboxylic acid anhydride group in the molecule. Examples are itaconic anhydride and maleic anhydride, with maleic anhydride being preferred. In principle, component (d) may be any copolymerizable olefinically unsaturated compounds which contain at least one tri-, di- or monoalkoxysilane group in the molecule or mixtures of such compounds. Examples are:

γ-(meth)acryloxypropyltrimethoxysilane,
γ-(meth)acryloxypropyltriethoxysilane,
γ-(meth)acryloxypropyltripropoxysilane,
γ-(meth)acryloxypropylmethyldimethoxysilane,
γ-(meth)acryloxypropylmethyldiethoxysilane,
γ-(meth)acryloxypropylmethyldipropoxysilane,
γ-(meth)acryloxybutylphenyldimethoxysilane,
γ-(meth)acryloxybutylphenyldiethoxysilane,
γ-(meth)acryloxybutylphenyldipropoxysilane,
γ-(meth)acryloxypropyldimethylmethoxysilane,
γ-(meth)acryloxypropyldimethylethoxysilane,
γ-(meth)acryloxypropylphenylmethylmethoxysilane,
γ-(meth)acryloxypropylphenylmethylethoxysilane, Further examples of compounds which can be employed as component (d) can be found in DE-A-40 08 343 on pages 35 (line 49 onward) to 41.

In principle, component (e) may be any copolymerizable compound different from components (a), (b), (c) and (d) or a mixture of such compounds. Examples are: aromatic vinyl compounds, for example styrene, vinyltoluene, α-methylstyrene, α-ethylstyrene, ring-substituted diethylstyrenes, isopropylstyrene, butylstyrenes and methoxystyrenes; vinyl ethers, for example ethyl vinyl ether, n-propyl vinyl ether, isopropyl vinyl ether, n-butyl vinyl ether and isobutyl vinyl ether, and vinyl esters, for example vinyl acetate, vinyl propionate and vinyl butyrate.

The polyacrylate resins (A) according to the invention can also be prepared by reacting polyacrylate resins containing functional groups with low molecular weight compounds which contain both a group which reacts with the functional groups of the polyacrylate resin and an epoxide, acid anhydride or tri-, di- or monoalkoxysilane group (cf. in this respect DE-A-40 08 343, pages 4 to 25).

Using the above-described autocrosslinkable polyacrylate resins, nonaqueous transparent topcoats can be prepared by generally well-known methods. The solvents which can be employed are all organic solvents which can be used for preparing coatings, with the exception of solvents containing groups which react with epoxide groups, acid anhydride groups or alkoxysilane groups. The topcoats contain no pigments, or only transparent pigments.

In addition to the polyacrylate resins employed according to the invention, the topcoats must also contain at least (B) one acid and/or base as crosslinking catalyst. Examples of suitable crosslinking catalysts are tertiary amines, such as ethyldimethylamine, diethylmethylamine, triethylamine, ethlydiisopropylamine [sic], tributylamine, 1-methylpyrrolidine, 1-methylpiperidine, 1,4-dimethylpiperazine, 1,4-diazbicyclo[2.2.2]octane or 1,8-diazabicyclo[5.4.0]undec7-ene, N,N-dimethylethanolamine, N,N-diethylpropanolamine, N,N-dibutylethanolamine, 1-amino-3-(dimethylamino)propane or 1-amino-2-(diethylamino)ethane, quaternary ammonium salts, aldimines, ketimines, Brönsted acids, such as p-toluenesulfonic acid, maleic acid and salicylic acid, and Lewis acids, for example dibutyltin dilaurate. It is of course also possible to employ mixtures of crosslinking catalysts.

The transparent topcoats according to the invention usually contain 0.1 to 3.0, preferably 0.5 to 2.0 and particularly preferably 1.0 to 1.5% by weight of the crosslinking catalyst or of the mixture of crosslinking catalysts, the weight percentages relating to the weight of the polyacrylate resin (A) (= 100% by weight) present in the coating.

The transparent topcoats according to the invention can also contain, in addition to the autocrosslinkable polyacrylate resin (A) and the crosslinking catalyst (B), further binder constituents, for example amino resins, in particular melamine resins, blocked polyisocyanates, polyester resins, alkyd resins, polyurethane resins and light stabilizers.

In step (1) of the above-described basecoat/clearcoat process, it is in principle possible to employ all pigmented basecoats suitable for the production of multicoat finishes. Such basecoats are well known to those skilled in the art. It is possible to employ both water-thinnable basecoats and basecoats based on organic solvents. Suitable basecoats are described in, for example, U.S. Pat. No. 3,639,147, DE-A-33 33 072, DE-A-38 14 853, GB-A-2 012 191, U.S. Pat. No. 3,953,644, EP-A-260 447, DE-A-39 03 804, EP-A-320 552, DE-A-36 28 124, U.S. Pat. No. 4,719,132, EP-A-297 576, EP-A-69 936, EP-A-89 497, EP-A-195 931, EP-A-228 003, EP-A-38 127 and DE-A-28 18 100.

In step (2) of the process, the solvent or the water is removed from the basecoat applied in step (1) in a flash-off phase. The basecoat layer can also be baked. However, this is disadvantageous on economic grounds, since the production of the multicoat finish then requires two baking operations instead of one.

The transparent topcoats according to the invention are preferably employed for producing multicoat finishes on car bodies, especially for producing metallic finishes of the basecoat/clearcoat type. They can be employed both for original finishing and also for refinishing. The coatings can, however, also be employed for coating substrates such as wood, glass, ceramic, stone, concrete, plastics, textiles, leather, cardboard and paper, which may have been pretreated. The coatings according to the invention can be applied to the substrate to be coated by spraying, brushing, immersion, flow coating, casting and rolling, preferably by spraying.

The polyacrylate resins (A) described above can also be employed for the preparation of pigmented coatings. The finishes produced with these coatings are also notable for their good properties.

The coatings according to the invention can be cured at temperatures from room temperature to 200° C., depending on the type and amount of the catalysts employed.

The invention is explained in more detail in the following examples. All data relating to quantities and percentages are to be understood as being by weight, unless expressly stated otherwise.

A) PREPARATION OF AUTOCROSSLINKABLE POLYACRYLATE RESINS ACCORDING TO THE INVENTION

Polyacrylate Resin Solution 1

727.2 parts of solvent naphtha and 120 parts of methacryloxypropyltrimethoxysilane (Silan GF 31, manufactured by Wacker) are charged to a steel vessel equipped with monomer inlet, initiator inlet, thermometer, oil heating and reflux condenser, where they are mixed and heated to 140° C. A mixture $\alpha$ of 72 parts of solvent naphtha and 72 parts of t-butyl perisononanoate is then added with stirring at a rate such that the addition of the mixture $\alpha$ is complete after 4 h 45 min. 15 minutes after beginning the addition of the mixture $\alpha$, a mixture $\beta$ consisting of 276 parts of n-butyl acrylate, 276 parts of t-butyl acrylate, 120 parts of styrene, 240 parts of glycidyl methacrylate and 168 parts of maleic anhydride is added to the reaction mixture at a rate such that the addition of the mixture $\beta$ is complete after 4 h. When the addition of the mixture $\alpha$ is complete, the reaction mixture is held at 140° C. for a further 2 h and then cooled to room temperature.

The acrylate resin solution obtained has a solids content of 60% (1 h, 130° C.).

Polyacrylate resin solution 2

727.2 parts of solvent naphtha are charged to a steel vessel equipped with monomer inlet, initiator inlet, thermometer, oil heating and reflux condenser, and heated to 140° C. A mixture $\alpha$ of 72 parts of solvent naphtha and 72 parts of t-butyl perisononanoate is then added with stirring at a rate such that the addition of the mixture $\alpha$ is complete after 4 h 45 min. 15 minutes after beginning the addition of the mixture $\alpha$, a mixture $\beta$ consisting of 276 parts of n-butyl acrylate, 276 parts of t-butyl acrylate, 120 parts of cyclohexyl methacrylate, 240 parts of glycidyl methacrylate, 168 parts of maleic anhydride and 120 parts of methacryloxypropyltrimethoxysilane is added to the reaction mixture at a rate such that the addition of the mixture $\beta$ is complete after 4 h. When the addition of the mixture $\alpha$ is complete, the reaction mixture is held at 140° C. for a further 2 h and then cooled to room temperature. The acrylate resin solution obtained has a solids content of 60% (1 h, 130° C.).

B) PREPARATION OF TRANSPARENT TOPCOATS ACCORDING TO THE INVENTION 80 parts of the above-described polyacrylate resin solution 1 or, respectively, 80 parts of the above-described polyacrylate resin solution 2, 1.4 parts of Tinuvin® 1130

(Ciba Geigy AG), 1.0 part of Tinuvin® 440 (Ciba Geigy AG) and 1.0 part of a commercially available 1% strength solution of a silicone oil (leveling assistant) are added with stirring to an initial charge of a solution of 1.5 parts of p-toluenesulfonic acid monohydrate in 8.9 parts of butanol. After the components have been thoroughly mixed, 6.2 parts of a commercially available 98% strength solution of a methanol-etherified melamine resin (Cymel® 301, manufactured by Dyno Cyanamid) are added. The resulting transparent topcoats have a solids content of 54% (1 h, 130° C.) and have a good stability on storage.

C) APPLICATION OF THE TRANSPARENT TOPCOATS ACCORDING TO THE INVENTION

A commercially available nonaqueous basecoat containing aluminum pigment is sprayed onto steel panels coated with a commercially available electro-deposition primer and a commercially available filler; the coatings are dried for 5 minutes at room temperature and then overcoated with the transparent topcoats according to the invention prepared in accordance with section B) (dry film thickness 40–45 μm). After a further drying time of 5 minutes at room temperature, the basecoat and topcoat layer are baked together for 20 minutes at 140° C. in a circulating-air oven. The resulting finishes are notable for good leveling, good resistance to organic solvents (100 back and forth strokes with a cotton-wool pad soaked with methyl isobutyl ketone have to be made before signs of incipient dissolution become visible on the surface of the coating), good resistance to acids and high gloss, and they exhibit no tendency to yellow.

D) COMPARATIVE EXAMPLE

Preparation of a Polyacrylate Resin 727.2 parts of solvent naphtha are charged to a steel vessel equipped with monomer inlet, initiator inlet, thermometer, oil heating and reflux condenser, and heated to 140° C. A mixture α of 72 parts of solvent naphtha and 72 parts of t-butyl perisononanoate is then added with stirring at a rate such that the addition of the mixture α is complete after 4 h 45 min. 15 minutes after beginning the addition of the mixture α, a mixture β consisting of 336 parts of n-butyl acrylate, 336 parts of t-butyl acrylate, 120 parts of styrene, 240 parts of glycidyl methacrylate and 168 parts of maleic anhydride is added to the reaction mixture at a rate such that the addition of the mixture β is complete after 4 h. When the addition of the mixture α is complete, the reaction mixture is held at 140° C. for a further 2 h and then cooled to room temperature.

The polyacrylate resin solution obtained has a solids content of 60% (1 h, 130° C.).

PREPARATION AND APPLICATION OF A TRANSPARENT TOPCOAT

The procedure is as described in section B), with the single exception that, instead of the polyacrylate resin solutions 1 and 2, the polyacrylate resin solution obtained by the above-described procedure is employed. The topcoat prepared in this manner is employed as described in section C) for the production of a multicoat topcoat finish. In contrast to the finishes obtained with the topcoats according to the invention, this finish exhibits poor leveling, and has a poor resistance to organic solvents (after just 2 back and forth strokes with a cottonwool pad soaked with methyl isobutyl ketone, signs of incipient dissolution become visible on the surface of the coating) and a low gloss.

We claim:
1. Autocrosslinkable polyacrylate resin prepared by free radical co-polymerization of a mixture of
   (a) an ester selected from the group consisting of esters of acrylic acid, methacrylic acid and mixtures thereof,
   (b) an epoxide selected from the group consisting of olefinically unsaturated epoxide compounds and mixtures thereof,
   (c) an anhydride selected from the group consisting of olefinically unsaturated acid anhydrides and mixtures thereof,
   (d) an unsaturated compound selected from the group consisting of olefinically unsaturated compounds containing at least one alkylsiloxane group per molecule, where said alkylsiloxane is selected from the group consisting of tri-, di- and monoalkoxysilanes, and
   (e) a further olefinically unsaturated compound different from (a), (b), (c) and (d), or a mixture of such unsaturated compounds,
characterized in that the polyacrylate resin is prepared by free radical co-polymerization, at temperatures of between 60° C. and 160° C., of a mixture of
   component (a) 0.5 to 65% by weight,
   component (b) 14 to 70% by weight,
   component (c) 10 to 50% by weight,
   component (d) 10 to 50% by weight, and
   component (e) 0 to 50% by weight,
the sum of the weight percentages for components (a) to (e) being 100% by weight, to give an autocrosslinkable polyacrylate resin which contains on statistical average at least one epoxide group per molecule, at least one acid anhydride group per molecule, and at least 0.2 tri-, di- or monoalkoxysilane groups per molecule, and has a number average molecular weight of between 1000 and 50,000.

2. Polyacrylate resin according to claim 1, characterized in that the autocrosslinkable polyacrylate resin has a number-average molecular weight of 1000 to 5000.

3. Polyacrylate resin according to claim 1, characterized in that the autocrosslinkable polyacrylate resin is prepared by free radical co-polymerization of a mixture of
   component (a) 10 to 65% by weight,
   component (b) 14 to 40% by weight,
   component (c) 10 to 30% by weight,
   component (d) 10 to 40% by weight, and
   component (e) 0 to 20% by weight.

4. Nonaqueous coating composition, characterized in that it contains
   (A) as binder, an autocrosslinkable polyacrylate resin according to claim 1, or a mixture of autocrosslinkable polyacrylate resins according to claim 1, and
   (B) a crosslinking catalyst selected from the group consisting of acids, bases and mixtures thereof.

5. Coating composition according to claim 4, characterized in that it contains a crosslinking catalyst selected from the group consisting of Lewis acids and Brönsted acids.

6. Coating composition according to claim 4, characterized in that the autocrosslinkable polyacrylate resin (A) is prepared by polymerizing a mixture of
   component (a) 10 to 65% by weight,
   component (b) 14 to 40% by weight,
   component (c) 10 to 30% by weight,
   component (d) 10 to 40% by weight, and component (e) 0 to 20% by weight.

7. Coating composition according to claim 4, characterized in that the autocrosslinkable polyacrylate resin (A) has a number-average molecular weight of from 1,000 to 5,000.

8. Process for the preparation of a multicoat finish, comprising the steps of
  (1) applying a pigmented basecoat to a substrate surface,
  (2) forming a polymer film from the basecoat applied in step (1),
  (3) applying a nonaqueous transparent topcoat composition, which is a coating composition according to claim 2, to form a basecoat layer, and subsequently
  (4) baking the basecoat layer and topcoat layer together.

9. Process according to claim 8, characterized in that the solids content of the transparent topcoat composition applied in step (3) is not less than 50% by weight.

* * * * *